C. E. JONES.
LICENSE PLATE CARRIER.
APPLICATION FILED JULY 8, 1921.
1,435,308.
Patented Nov. 14, 1922.
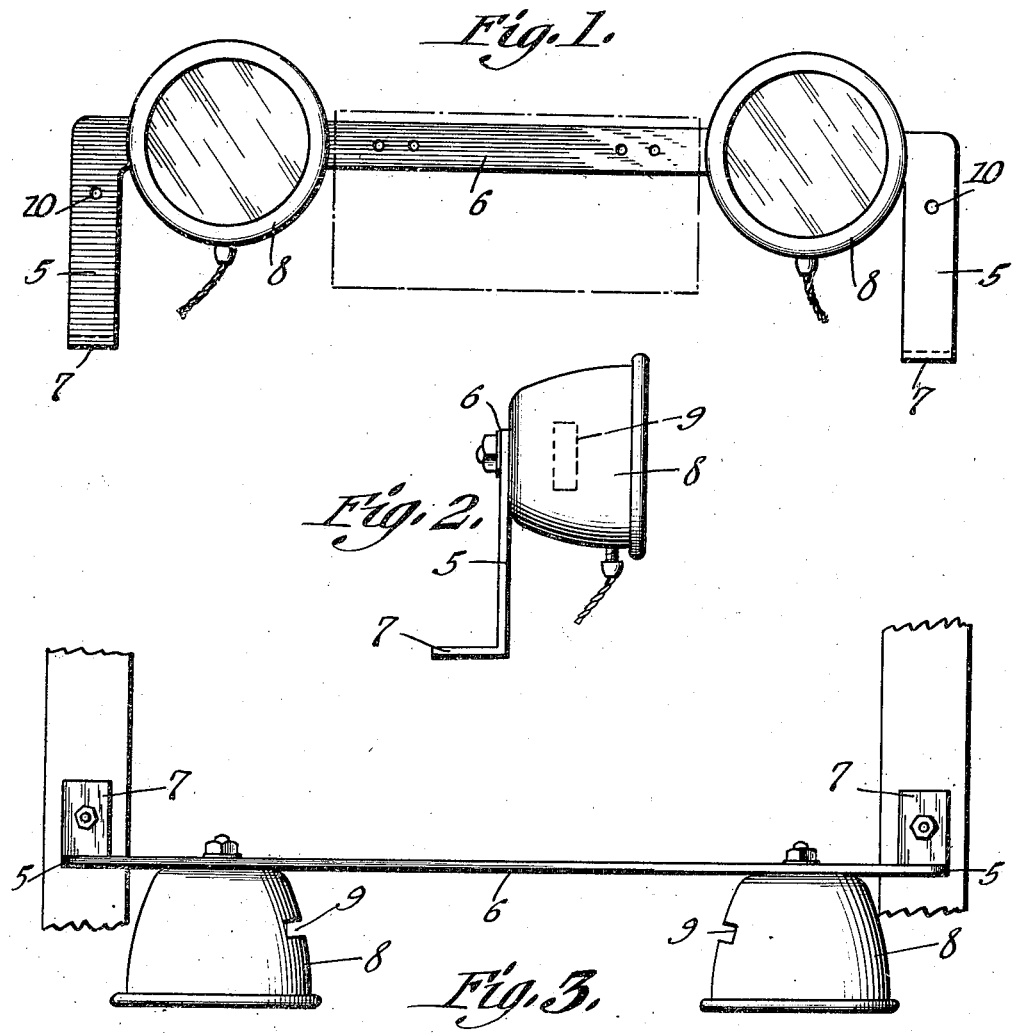

Patented Nov. 14, 1922.

1,435,308

UNITED STATES PATENT OFFICE.

CLESS E. JONES, OF CRAWFORDSVILLE, INDIANA.

LICENSE-PLATE CARRIER.

Application filed July 8, 1921. Serial No. 483,308.

*To all whom it may concern:*

Be it known that I, CLESS E. JONES, a citizen of the United States, residing at Crawfordsville, in the county of Montgomery and State of Indiana, have invented a new and useful License-Plate Carrier, of which the following is a specification.

This invention has reference to lamp supports or brackets, the primary object of the invention being to provide a lamp bracket especially designed for use at the front end of a motor vehicle, whereby the license plate at the front of a vehicle may be illuminated by the light rays projected from the headlights.

Another object of the invention is to provide a combined lamp support and license bracket, the same being constructed for attachment to the side rails of the chassis of the vehicle, thereby relieving the front mud guards or fenders of the weight of the lamps, which are usually connected thereto.

With the foregoing and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Referring to the drawing:—

Figure 1 is a front elevational view of a combined lamp support and license tag bracket constructed in accordance with the present invention.

Figure 2 is an end elevational view of the same.

Figure 3 is a plan view thereof.

Referring to the drawing in detail, the device includes a bar having right angled ends 5, the portion between the ends which is indicated by the reference character 6 being designed for supporting a license tag, there being provided suitable openings formed therein to receive the bolts to secure the tag thereto.

The extremity of each right angled end 5 extends rearwardly as indicated at 7, so that the same may be bolted to the upper surfaces of the side rails of the chassis associated therewith, the extremities 7 being such as will lie flat on the upper surfaces of the side rails.

As shown, the head-lamps 8 are bolted to the bar 6, so that the openings 9 of the lamps will project the light rays laterally onto the tag supported between the lamps. If it is desired to support the lamps 8 on the bracket in a manner to provide a floodlight, the lamps may be positioned in the openings 10 of the right angled ends 5, thus moving the lamps a greater distance apart.

Having thus described the invention, what is claimed as new is:—

In a device of the character described, a bar having downwardly extending portions formed with right angled extremities, the right angled extremities providing supporting means by which the bar may be secured to the chassis of a motor vehicle, and said bar having openings to accommodate lamp supporting bolts.

In testimony that I claim the foregoing as my own, I have hereto affixed my signature in the presence of two witnesses.

CLESS E. JONES.

Witnesses:
 CLAYTON ROGERS,
 AVAIRD L. EADS.